United States Patent

Wike, Jr.

[11] Patent Number: 5,177,347
[45] Date of Patent: Jan. 5, 1993

[54] AXIALLY INVARIANT PATTERN SCANNING APPARATUS

[75] Inventor: Charles K. Wike, Jr., Sugar Hill, Ga.

[73] Assignee: NCR Corporation, Dayton, Ohio

[21] Appl. No.: 762,705

[22] Filed: Sep. 19, 1991

[51] Int. Cl.⁵ .............................................. G06K 7/10
[52] U.S. Cl. ................................. 235/467; 235/454; 235/462; 235/470; 235/472
[58] Field of Search ............... 235/467, 454, 462, 470, 235/472

[56] References Cited

U.S. PATENT DOCUMENTS

| | | | |
|---|---|---|---|
| 3,812,374 | 5/1974 | Tuhro | 250/568 |
| 3,958,104 | 5/1976 | Zuckerman | 356/61.11 E |
| 3,978,317 | 8/1976 | Yamaguchi et al. | 235/61.11 E |
| 3,988,573 | 10/1976 | Hayosh et al. | 235/61.11 E |
| 4,560,862 | 12/1985 | Eastman | 235/467 |
| 4,575,625 | 3/1986 | Knowles | 235/470 |
| 4,794,238 | 12/1988 | Hampton | 235/470 |
| 4,939,356 | 7/1990 | Rando et al. | 235/467 |
| 4,967,076 | 10/1990 | Schuhmacher et al. | 235/467 |
| 4,971,410 | 11/1990 | Wike, Jr. et al. | 235/472 |
| 5,115,121 | 5/1992 | Bianco et al. | 235/470 |

Primary Examiner—William L. Sikes
Assistant Examiner—Scott A. Ouellette
Attorney, Agent, or Firm—Richard W. Lavin

[57] ABSTRACT

An optical scanning unit for use in a bar code scanner for scanning a bar code label includes a motor driven hollow drive shaft through which are projected laser light beams from a laser source positioned adjacent one end of the drive shaft. Mounted on the other end of the drive shaft is a deflecting member which includes a first reflecting surface for deflecting the laser light beams outwardly towards a ring of mirrors each of which is located in a plane parallel to the axis of the drive shaft. The light beams deflected from the ring of mirrors are directed towards a second reflecting surface on the deflecting member which surface deflects the received scanning light beams in a direction parallel to the axis of the hollow drive shaft thereby forming a scan pattern comprising a plurality of intersecting scan lines whose center of intersection remains constant as the distance between the deflecting member and the bar code label changes.

12 Claims, 4 Drawing Sheets

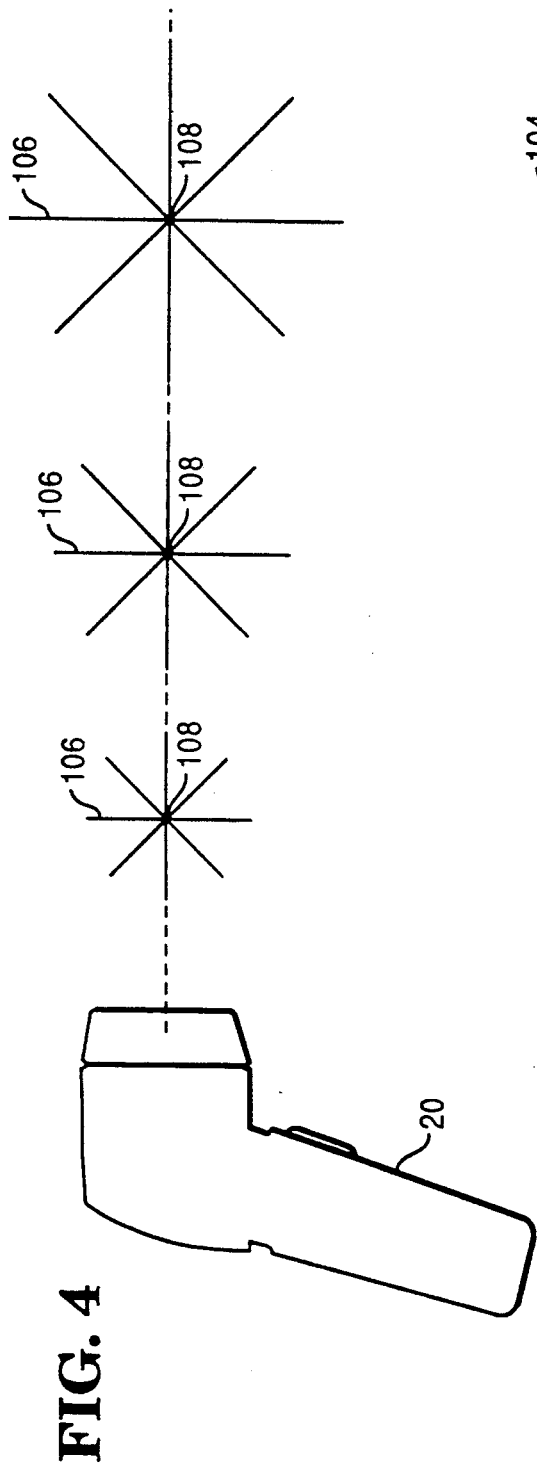
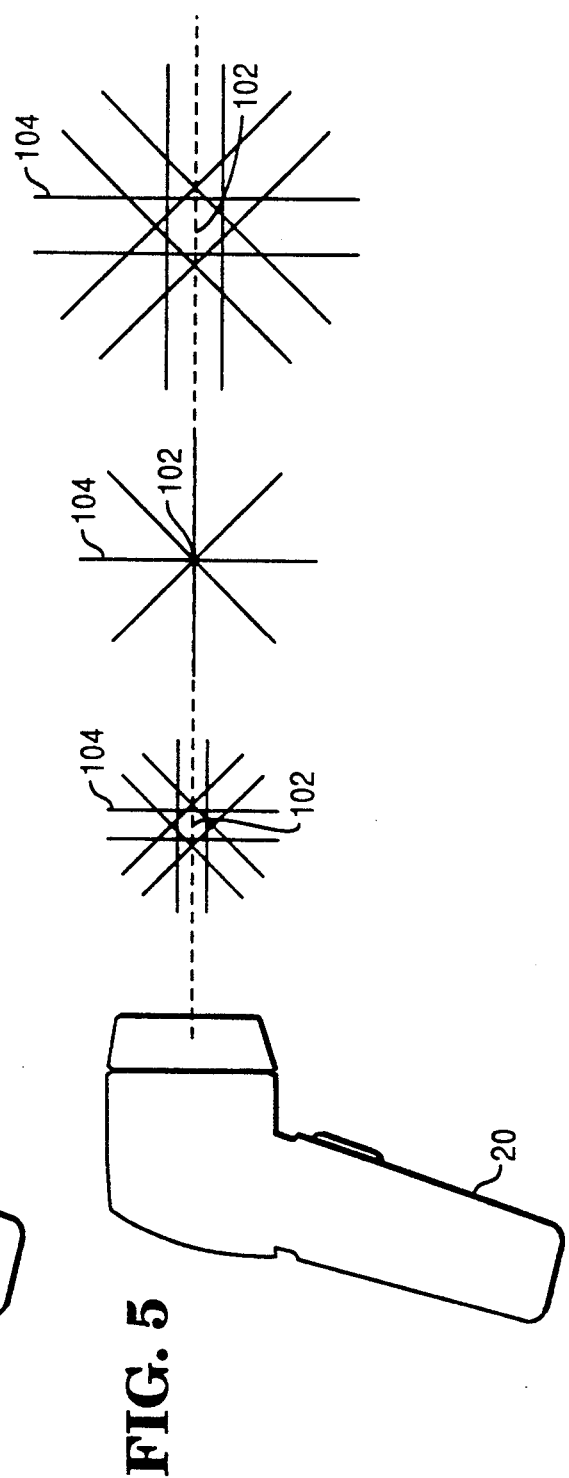
FIG. 4
FIG. 5

AXIALLY INVARIANT PATTERN SCANNING APPARATUS

BACKGROUND OF THE INVENTION

The present invention relates to optical scanning devices and more particularly to a portable scanning device for generating a scan pattern which retains the same configuration in space throughout the scanning volume.

In the present-day merchandising point-of-sale checkout systems, data pertaining to the purchase of a merchandise item is obtained by reading data encoded indicia such as a bar code label printed on or attached to the purchased merchandise item. Reading systems which have been constructed to read this type of bar code include stationary optical scanning systems normally located within the cabinet structure of a checkout counter or hand-held bar code scanners which emit a single or multiple line scan pattern which are manually moved pass the bar code label that is to read. Where a hand-held bar code scanner is utilized in scanning a bar code label, it has been found that the distance between the laser scanner and the bar code label is critical in locating the scan pattern on the label. As the distance between the scanner and the label increases, the scan pattern becomes larger but the intensity of the scan pattern is reduced which presents problems in targeting a scan pattern on the bar code label. It would be desirable to have the center of the scan pattern remain at the same intensity regardless of the distance of the bar code label from the scanner which would enhance the correct positioning of the scan pattern on the bar code label thereby increasing the percentage of good read operations occurring during a checkout operation.

SUMMARY OF THE INVENTION

There is provided, in accordance with the present invention, an optical scanning device which may be mounted in a portable hand-held scanner or other types of optical scanners. The scanning unit includes a housing member within which is mounted a motor for rotating a hollow drive shaft through 360° of rotation. Mounted adjacent to one end of the shaft is a laser member which projects a laser light beam through the shaft. Mounted on the other end of the shaft is a deflector member which includes two deflecting mirror surfaces, one of which deflects the light beam outwardly to a cylindrical shaped array of pattern forming mirrors. The cylindrical array of mirrors remains stationary. The scanning beams are reflected back by the pattern forming mirrors and towards the second deflecting mirror surface on the deflecting member secured to the rotating shaft. The second deflecting mirror surface comprises a pattern forming mirror which rotates about the spin axis of the drive shaft and moves with the first deflecting mirror surface. The pattern mirror surface deflects the scanning beam in the direction of the spin axis. As the second deflecting mirror surface rotates about the spin axis, a plurality of intersecting scan lines 106 (FIG. 4) are generated, each having the same center 108, and spreading out in the same direction as the distance between the scanner and the bar code increases (FIG. 4). The scan lines are all angularly separated to give an omnidirectional effect. The common axis provides an aiming line at a central reference point for targeting the scan pattern on the bar code label. Collection means are mounted in the front portion of the scanning unit for collecting and generating electrical signals in accordance with the collected light beams reflected from the scanned bar code label collected by the collecting means.

It is therefore a principal object of this invention to provide an optical scanning device which generates a scan pattern whose center does not change as the distance between the scanner and the bar code label is varied.

It is another object of this invention to provide a compact optical scanning device which generates a scan pattern which has a definite center, and provides a central spot to direct an operator to the center of the scan pattern.

It is a further object of this invention to provide an optical scanning device which provides a series of scan lines with appropriate angular spacing to achieve an omnidirectional scan pattern for use in scanning high aspect ratio bar code labels.

It is another object of this invention to provide an optical scanning device which is simple in construction and therefore low in cost.

BRIEF DESCRIPTION OF THE DRAWINGS

These and other objects, features and advantages of the invention as well as the invention itself, will become more apparent to those skilled in the art in light of the following detailed description taken into consideration with the accompanying drawings wherein like reference numerals indicate like or corresponding parts throughout the several views and wherein:

FIG. 4 is a diagram showing the size of the scan pattern generated by the present invention as the scanner is moved away from the bar code label; and FIG. 5 illustrates the size and the configuration of the scan pattern of present day scanners showing the distortion of the scan pattern as the bar code scanner is moved away from the bar code label.

DETAILED DESCRIPTION OF THE PREFERRED EMBODIMENT

Figure 1:
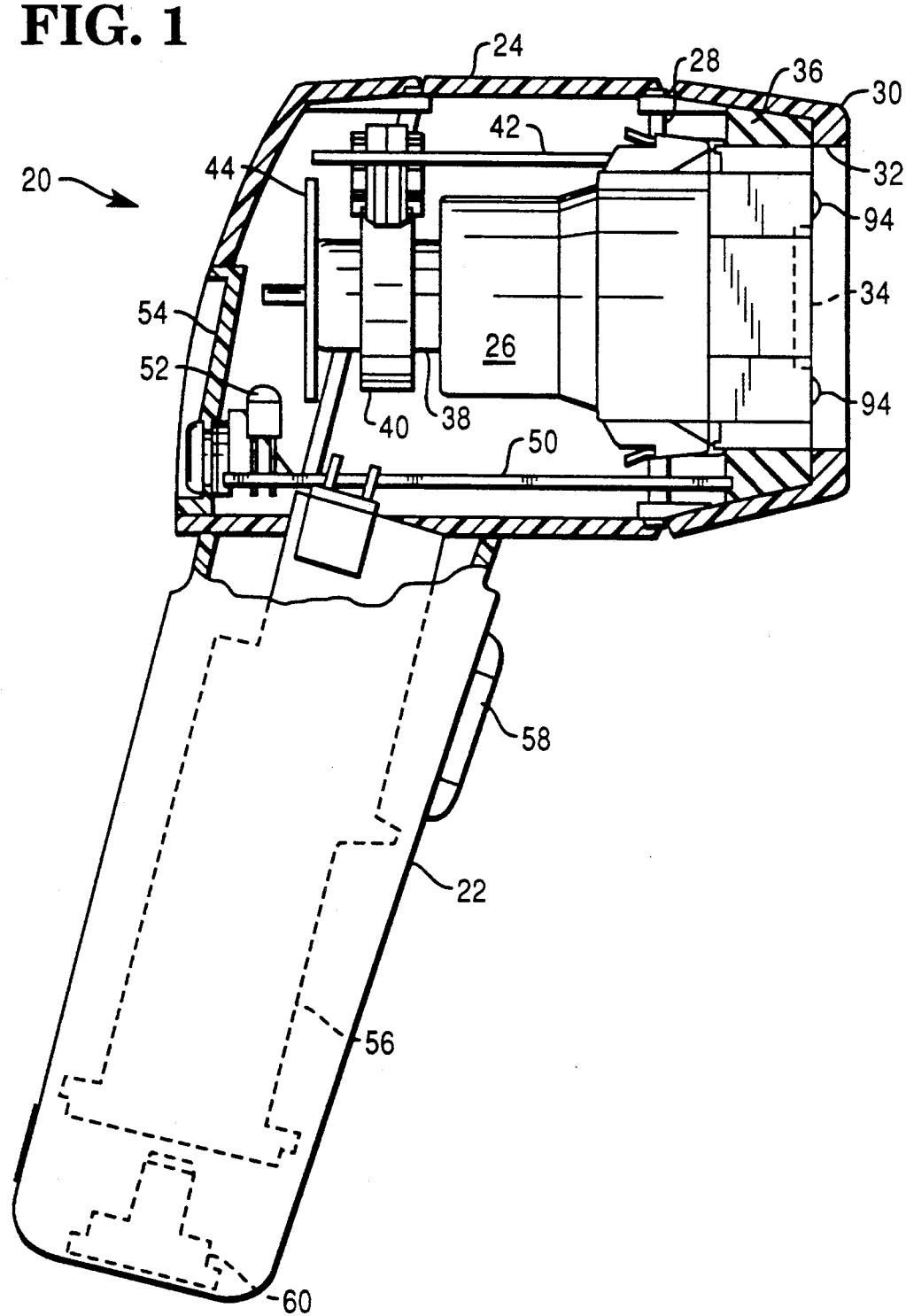
FIG. 1 is a partial side view of a hand-held bar code scanner in which the scanning unit of the present invention is located, with a portion of the body portion removed, showing the location of the scanning elements within the body portion of the scanner.

Referring now to FIG. 1, there is shown a partial side view of a hand-held bar code scanner which includes a scanning unit incorporating the present invention. While the present invention is shown mounted in a hand-held optical scanner, it is obvious that the present invention may be employed with any type of optical scanning system which utilizes pattern forming mirrors for generating a scan pattern. As shown, the hand-held bar code scanner generally indicated by the numeral 20 comprises a handle portion 22 and a main body portion 24. A scanning unit 26 is mounted within the main body portion 24 by means of a support ring 28 which, in addition to supporting the scanning unit 26, also supports a cover member 30 having an opening 32 in which is positioned the face portion 34 of the scanning unit 26. The cover member 30 may be constructed of a transparent material such as acrylic and is shock mounted with respect to the face portion 34 by means of a ring of elastic foam material 36. Slidably mounted on a rear extension portion 38 of the scanning unit 26 (FIG. 3) is a bracket member 40 supporting a printed circuit board 42 which contains the video circuits associated with the operation of the scanning unit. The bracket member 40 may be constructed of a hard plastic material such as polycarbonate.

Figure 2:
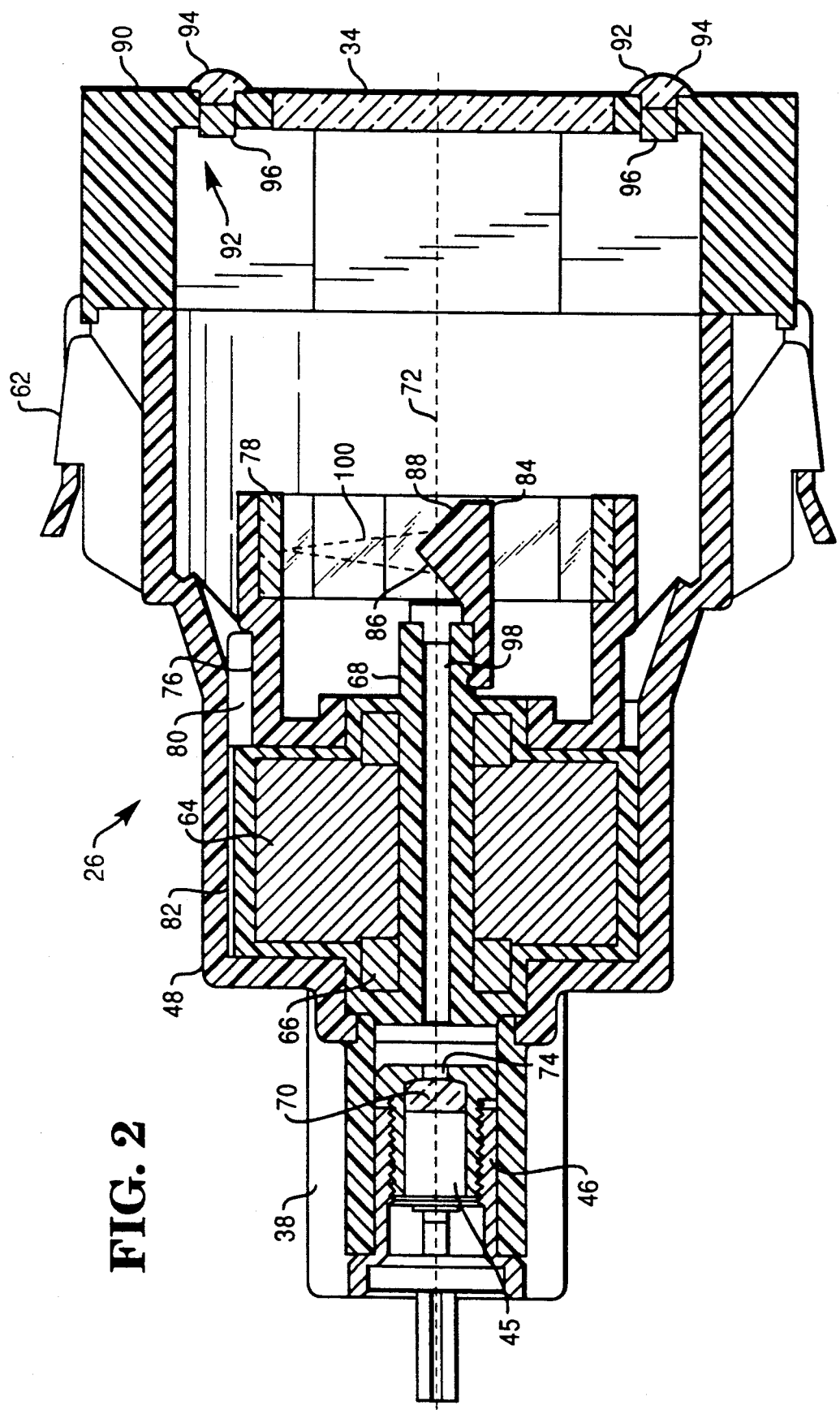
FIG. 2 is a sectional side view of the scanning unit shown in FIG. 1.
Figure 3:
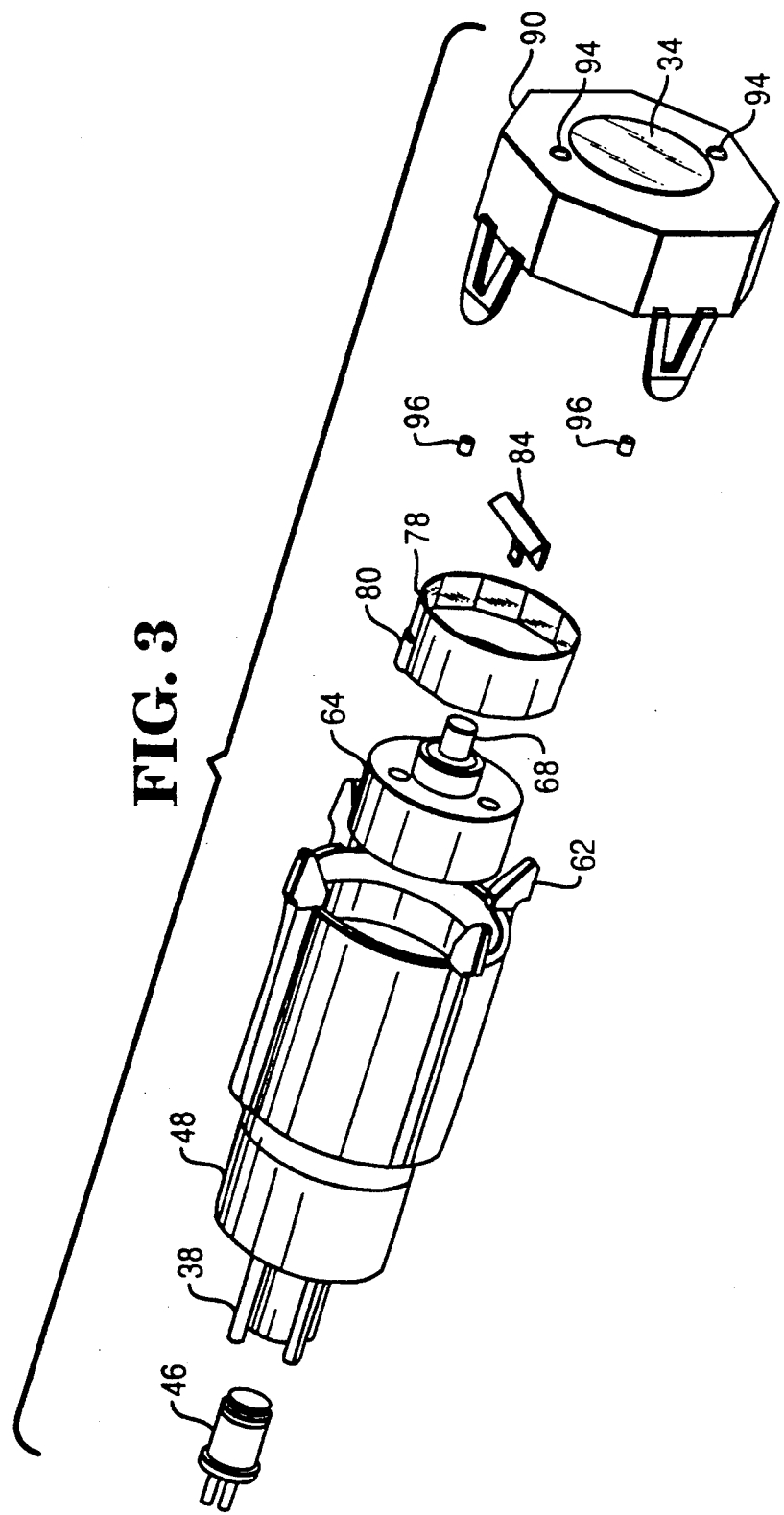
FIG. 3 is an exploded view of the scanning unit used in the present invention showing the elements which generate a scanning pattern including the cylindrical shaped array of pattern forming mirrors and the collector elements which collect the reflected light beams from the scanned bar code label.

Positioned on the extension portion 38 (FIG. 1) is a printed circuit board 44 containing the laser drive circuit for a laser diode 45 (FIG. 2). The board 44 is secured to the extension portion 38 of the frame support member 48 of the scanning unit 26 (FIGS. 2 and 3). Mounted along the lower edge of the main body portion 24 is a printed circuit board 50 which contains the digital interface logic circuits for controlling the processing of digital signals generated as a result of the operation of the scanning unit 26.

Secured to the printed circuit board 50 is a light emitting diode 52 for use in indicating the occurrence of a good read operation by the scanning unit in a manner that is well known in the art. The diode 52 can be viewed through a transparent member 54 mounted in the rear surface of the main body portion 24. Also secured to the printed circuit board 50 is a circuit board 56 which is located in the handle portion 22 of the scanner and which controls the power supply to the scanning unit 26. A button mechanism 58 located along the forward edge of the handle portion 22 is connected to the printed circuit board 56 to provide an on/off operation of the scanning unit. Located in the lower edge of the handle portion 22 is a recessed plug portion 60 for receiving a cable (not shown) which supplies power to the scanner and also transmits electrical signals outputted by a microprocessor (not shown) located on the printed circuit board 50 representing the data signals generated as a result of scanning the bar code label.

Referring to the drawings, FIG. 2 is a cross-sectional view of the assembled scanning unit 26 while FIG. 3 is an exploded perspective view of the scanning unit. As shown in those figures, the frame support member 48, which may be molded of any type of a shock resistant plastic materials such as polycarbonate, includes a plurality of latching portions 62. Mounted within the support member 48 is a motor 64. Journaled within the motor by bearings 66 (FIG. 2) is a hollow drive shaft 68 extending through the motor 64. Mounted within the rear extension portion 38 of the frame support member 48 is a brass laser diode support member 46 which supports the laser diode 45 and a collimating and focusing lens member 70, both of which are in alignment with the spin axis 72 of the drive shaft 68. The diode 45 outputs a diverging light beam which is collimated and focused on a reference plane (not shown) in front of the scanning unit by the lens member 70. A circular aperture stop 74 positioned adjacent the lens member 70 has a cross-section which is smaller than the lens member 70 for controlling the size of the laser light beam projected at the reference plane in a manner that is well known in the art.

Slidably mounted within the frame support member 48 is a molded mirror support member 76 constructed of any type of polycarbonate plastic which rigidly supports a cylindrical shaped array of pattern forming mirrors 78. The cylindrical mirror array 78 would typically have an odd number of mirrors on the order of seven or nine mirrors to handle large aspect ratio tags having an aspect ratio on the order of 6. The support member 76 includes a rearwardly extending key rib portion 80 which is positioned within a key slot 82 located in the frame support member 48 for snap fitting the support member 76 within the support member 48. Secured to the front end of the drive shaft 68 is a wide conical shaped deflecting member 84 (FIG. 3) which includes a rearwardly facing deflecting mirror surface 86 and a forward deflecting pattern forming mirror surface 88. The surfaces 86 and 88 form an angle of ninety degrees (FIG. 2). The mirror surface 88 utilizes the total width of the deflecting member 84 while the mirror surface 86 utilizes a small portion of the width of the deflecting member 84.

Mounted within a ring portion 90 of the frame support member 48 is a glass face member 34 (FIGS. 2 and 3). Also mounted within the ring portion 90 of the support member 48 are a pair of light collecting elements generally indicated by the numeral 92 which includes a light collection facet 94 and a photodetector 96 for converting the light collected by the collection facet 94 into electrical signals in a manner that is well known in the art.

The operation of the laser diode 45 will output a narrow laser light beam along the spin axis 72 of the scanning unit 26. The laser light beam will be projected through the bore 98 located in the drive shaft 68 where it impacts on the rotating deflecting mirror surface 86. The light beam designated as 100 will be deflected radially outwardly by the mirror surface 86 to impact on the cylindrical array of mirrors 78 which in turn deflect the light beam in a generally downward direction towards the deflecting mirror surface 88 of the deflecting member 84. The light beams impacting on the deflecting surface 88 will be deflected in a generally horizontal forward direction through the acrylic face member 34 forming a multi-line scanning pattern 106 (FIG. 4) for scanning a coded bar code label (not shown) positioned adjacent the front portion of the bar code scanner 20. The scattered light beams reflected from the scanned bar code label are detected by the collection lens member 94 and transmitted to the detector member 96 which converts the received light beams into electrical signals in a manner that is well known in the art.

Referring now to FIG. 5, there are shown examples of how a scan pattern generated by the prior art expands as the distance between the bar code scanner and the bar code label increases. As shown, the center portion 102 of the scan pattern 104 will contract as the distance increases and then expand to provide a wide center area which is hard to locate on a bar code label when moving the bar code towards or away from the scanner during a reading operation. As shown in FIG. 4, the scan pattern 106 produced by the present invention has a concentric center portion 108 which remains constant as the scan pattern expands when the distance between the bar code label and the bar code scanner increases. It will thus be seen that the concentric center portion 108 will always be at the same point location and it will be easily visible to locate the scan pattern on the bar code label.

Although the preferred embodiment of the present invention has been described herein, it is not intended that the invention be restricted thereto but that it be limited only by the true spirit and the scope of the appended claims.

What is claimed is:

1. A method for generating a scan pattern for scanning a bar code label comprising the steps of:
 transmitting a scanning light beam along a first light path which is focused in a reference plane;
 mounting a first rotating deflecting surface in said first light path;
 deflecting the scanning light beam outwardly from said first light path along a second light path extending in a direction generally perpendicular to said first light path;
 positioning a first deflecting surface in said second light path for deflecting the scanning light beams along a third light path which extends in a direction generally perpendicular to said first light path; and
 mounting a second rotating deflecting surface in said third path for deflecting the scanning light beams in a direction parallel to said first light path for forming a scan pattern in said reference plane having a plurality of intersecting scan lines for scanning a bar code label in which the center of the intersecting scan lines will remain constant as the distance between the second rotating deflecting surface and the bar code label changes.

2. The method of claim 1 in which the step of positioning further includes the step of mounting the first deflecting surface in a plane which is parallel to said first light path for deflecting the scanning light beams inwardly towards the first light path.

3. The method of claim 1 which further includes the step of mounting a detector member facing the bar code label and receiving scanning light beams reflected from the scanned bar code label for converting the received light beams to decodable signals representing the coded data on the bar code label.

4. In a scanning system having a spin axis along which light beams are projected for scanning coded indicia and then reflected from the scanned coded indicia, means for generating a scan pattern comprising:
 means for projecting scanning light along said spin axis;
 a deflector element mounted in said spin axis including a first reflecting surface for deflecting the light beams projected along said spin axis in a direction generally perpendicular to the spin axis and a second reflecting surface for deflecting the scanning light beams in a direction parallel to a spin axis; and
 a plurality of reflecting elements mounted around said deflector means, said reflecting elements deflecting the light beams reflected from the first reflecting surface towards the second reflecting surface whereby the second deflecting surface will deflect the scanning light beams in a direction along said spin axis for forming a scan pattern whose center will remain constant as the distance between the second deflecting surface and the bar code label changes.

5. The scanning system of claim 4 which further includes detector means facing said coded indicia for collecting the light beams reflected from the scanned coded indicia, said detector means converting the collected light beams into decodable signals.

6. The scanning system of claim 4 in which said deflector element is rotated about said spin axis and said first and second deflecting surfaces are orientated at ninety degrees to each other on said deflector element.

7. The scanning system of claim 6 in which the width of the second deflecting surface is greater than the width of the first deflecting surface.

8. The scanning system of claim 6 in which said reflecting elements comprise a ring of mirrors each of which is mounted in a plane parallel to said spin axis for deflecting the light beams towards said spin axis.

9. In a scanning system having a spin axis along which light beams are projected for scanning a coded indicia, means for forming a scan pattern comprising:
 a rotating hollow drive shaft mounted on said spin axis;
 a source of scanning light beams positioned at one end of said shaft for projecting the light beams along said spin axis;
 deflector means secured to the other end of said drive shaft;
 said deflector means including a first reflecting surface extending across the spin axis for deflecting the scanning light beams along a first light path extending in an outward direction from said spin axis and a second reflecting surface extending across said spin axis and positioned downstream of said first reflecting surface; and
 a ring of reflecting mirror members mounted around said deflector means and in said first light path for deflecting the received scanning light beams along a second light path towards the second reflecting surface which reflects the scanning light beams along said spin axis in the form of a scan pattern whose center will remain the same as the distance between the second reflecting surface and the bar code label changes.

10. The scanning system of claim 9 in which said first and second reflecting surfaces are orientated at ninety degrees to each other on said deflector element.

11. The scanning system of claim 10 in which the width of the second deflecting surface is greater than the width of the first deflecting surface.

12. The scanning system of claim 9 which further includes detector means facing said coded indicia for collecting light beams reflected from the scanned coded indicia, said detector means converting the collected light beams into decodable signals.

* * * * *

UNITED STATES PATENT AND TRADEMARK OFFICE
CERTIFICATE OF CORRECTION

PATENT NO. : 5,177,347
DATED : January 5, 1993
INVENTOR(S) : Charles K. Wike, Jr.

It is certified that error appears in the above-identified patent and that said Letters Patent is hereby corrected as shown below:

Column 5, lines 15 and 20, "beams" should be --beam--.

Column 6, line 54, "beams" should read --beam--.

Signed and Sealed this

Twenty-eighth Day of December, 1993

BRUCE LEHMAN

Attest:

Attesting Officer

Commissioner of Patents and Trademarks